United States Patent [19]

West, Jr. et al.

[11] Patent Number: 5,109,286
[45] Date of Patent: Apr. 28, 1992

[54] CATV REVERSE PATH MANIFOLD SYSTEM

[75] Inventors: Lamar E. West, Jr., Maysville; James O. Farmer, Lilburn, both of Ga.

[73] Assignee: Scientific-Atlanta, Inc., Atlanta, Ga.

[21] Appl. No.: 446,695

[22] Filed: Dec. 6, 1989

Related U.S. Application Data

[63] Continuation-in-part of Ser. No. 166,302, Mar. 10, 1988, Pat. No. 4,912,760, and a continuation-in-part of Ser. No. 279,619, Dec. 5, 1988.

[51] Int. Cl.[5] .............................................. H04N 7/167
[52] U.S. Cl. .................................... 358/349; 380/52; 358/85
[58] Field of Search .......................... 380/6, 7, 20, 52; 455/3-5, 26.1; 358/85, 86, 349

[56] References Cited

U.S. PATENT DOCUMENTS

Re. 31,639  7/1984  Nicholson ................................ 455/4
3,755,737   8/1973  Eller ...................................... 455/5 X
3,886,454   5/1975  Oakley et al. .......................... 455/5 X
4,912,760   3/1990  West, Jr. et al. ........................ 380/7

Primary Examiner—Thomas H. Tarcza
Assistant Examiner—Tod Swann

[57] ABSTRACT

A cable television reverse manifold system is coupled between first and second diplexers of off-premises subscriber service providing equipment. The diplexers separate the transmission path between a headend and a subscriber into downstream or forward and upstream or reverse transmission paths. In one embodiment, the reverse manifold apparatus combines signals from at least one subscriber for transmission to the headend. In another embodiment including a data receiver and a controller, the off premises service providing equipment may be controlled by the subscriber. In yet a third embodiment, a radio frequency transmitter is coupled between the controller and the upstream diplexer which may actuate a plurality of simultaneous data transmissions over separate data channels in the notoriously noisy subsplit 5-30 megahertz transmission spectrum.

14 Claims, 6 Drawing Sheets

CATV REVERSE PATH MANIFOLD SYSTEM

CROSS-REFERENCE TO RELATED APPLICATION

This application is a continuation-in-part of U.S. Ser. No. 166,302 filed Mar. 10, 1988 now U.S. Pat. No. 4,912,760 and U.S. application Ser. No. 279,619, filed Mar. 10, 1988 and Dec. 5, 1988 respectively, and entitled "Off-Premises Cable Television Channel Interdiction Method and Apparatus," and is related by subject matter to the following U.S. patent applications filed concurrently herewith: U.S. application Ser. No. 07/446,602 entitled "Optimum Amplitude and Frequency of Jamming Carrier in Interdiction Program System;" U.S. application Ser. No. 07/446,603 entitled "Picture Carrier Controlled Automatic Gain Control Circuit for Cable Television Interdiction or Jamming Apparatus;" and U.S. application Ser. No. 07/446,603 entitled "CATV Subscriber Disconnect Switch."

BACKGROUND OF THE INVENTION

1. Technical Field

This invention relates generally to the field of cable television systems and, more particularly, to apparatus for providing a reverse transmission path from a CATV subscriber to a headend.

2. Description of the Prior Art

At a headend of a cable television system, a scrambler is normally provided to encode premium television channels. The applied scrambling precludes reception by an unauthorized converter/decoder at a connected subscriber premises. Data representing channels or tiers of programming are addressably transmitted to a particular converter/decoder and stored in an authorization memory. As a result of the addressed transmission, a subsequently transmitted program is authorized and the decoder portion of the converter/decoder will be selectively enabled to decode the scrambled premium channel or program.

The provision of one scrambler per premium channel at the headend and the inclusion of a descrambler in each converter/decoder at the premises of the television receiver is particularly expensive. Furthermore, providing the converter/decoder on premises has turned out to be a great temptation to service pirates who imaginatively seek ways to receive premium channels. As a result, cable television equipment manufacturers have entered into a veritable war with such pirates resulting in complicated service authorization protocols in some instances involving multiple layers of encryption. Decryption and descrambling processes involve transmission of keys for unscrambling and of other forms of service authorization data by both in-band and out-of-band downstream data transmission schemes further increasing the costs of the converter/decoder.

The cable industry has recently resorted to look for new technology and to take a second look at technology developed in the early stages of development of cable television including negative and positive trap technology and interdiction systems to remove equipment off the subscriber's premises. Precipitating the removal of equipment from the subscribers' premises has been the provision of television channel conversion equipment within the new television receivers sold today and the predominance of so-called cable ready receivers. In other words, the converter portions of converter/decoders are in many instances no longer required. Also, removal of equipment from the subscribers' premises accomplishes a removal of equipment from the hands of pirates. Consequently, all forms of equipment known for jamming, scrambling, gating, encoding and encrypting television transmission to the subscriber of a cable television system are being considered for off-premises applications.

Negative traps, for example, are devices located at the drop to a subscriber's dwelling and attenuate a significant portion of a premium television channel rendering that channel unusable by the subscriber. In the conventional embodiment, negative traps are made using L-C filter techniques. The result is a notch with finite quality, Q, and finite shape factor. In the case of a single channel negative trap, the center of the notch is usually located at the picture carrier frequency of the channel to be removed. This technique, sometimes called a static negative trap, requires attenuation at the picture carrier of at least 60 dB to be effective.

Negative traps are usually mounted outside the subscriber's home (typically at the tap) and thereby minimize the exposure associated with placing hardware inside the subscriber's dwelling. Finally, some cable television operators view the negative trap as a more secure means of subscriber control than is sync suppression, as picture reconstruction is viewed as substantially more difficult.

Positive trap systems utilize a narrow band-rejection notch filter just as do negative trap systems. However, unlike negative trap systems which are used to attenuate or trap a premium channel transmission, the notch filter is used to restore the premium television channel. In this scenario, an interfering signal is placed inside the premium television channel at the cable television headend. This interfering signal is then removed at the drop to the subscriber's dwelling by use of the notch filter. Ideally this notch filter removes only the interference without removing a significant amount of television information.

Another form of off-premises equipment is an addressable tap system which was developed by Scientific Atlanta in 1983 or 1984. In this system, an off-premises "tap" located at the drop and addressed by a headend control system, gates a premium channel into the subscriber's premises. The gate may also be addressably closed under headend control to deny service to the subscriber. The addressability of the addressable tap technology has been adapted for switching negative and positive traps in an out of the CATV transmission path. However, all such products did not prove at the time to be viable alternatives to inside-the-home signal descrambler/converters.

A relatively recent technique for premium channel control is the interdiction system, so-called because of the introduction of an interfering signal at the subscriber's location. Most embodiments consist of a pole-mounted enclosure located outside the subscriber's premises designed to serve at least one and up to four or more subscribers. This enclosure contains at least one microprocessor controlled oscillator and switch control electronics to secure several television channels. Control is accomplished by injecting an interfering or jamming signal into unauthorized channels from this pole-mounted enclosure. To improve efficiency and to save costs, one oscillator may be used to jam several premium television channels. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

Cost reduction is achieved in the systems discussed above, i.e. trap and interdiction systems, by providing shared housings outside the subscribers' premises for each of a plurality of subscriber units, for example, four such units, and common circuitry associated with the several subscriber units as, for example, is provided by FIG. 2 of U.S. Pat. No. 4,912,760. These are mounted out-of-doors on poles or in pedestals for serving especially suburban subscribers. Also, indoor housings are known from so-called multiple dwelling unit systems where a cable television system supplies service to apartment buildings or condominium complexes.

In most if not all of these systems, however, situations arise when it is appropriate to provide a return or reverse path from a particular subscriber to a headend. The need for a reverse path has been recognized since the 1970's. Then, it was envisioned that a number of services could be realized over a cable television distribution plant if a reverse path is provided. The services included remote meter reading, fire and burglar alarm, energy management, home shopping, subscriber polling, and pay-per-view television services. However, in the 1970's and 1980's the preponderance of subscriber service providing equipment was physically located on the subscriber's premises. Consequently, there was no attention paid to a problem today of providing reverse path transmission in an off-premises subscriber equipment environment.

One advance in the art of reverse path transmission from the early days of design of two way addressable cable television systems was the two way distribution amplifier shown in FIG. 4 of the present application. An arrangement is provided for splitting the cable television spectrum into forward and reverse frequency bands. According to a so-called sub-split distribution plant, the frequency band of 54–550 megahertz is reserved for forward, downstream transmission from the headend to the subscriber and the band from 5–30 megahertz is reserved for reverse or upstream transmission. Included in the typical distribution amplifier are diplex filters or diplexers which provide separate paths for the forward and reverse directions on one side and a path for a combined frequency spectrum on the other side.

Typically, a subscriber decoder/converter is provided with a keyboard or other data entry means through which device a subscriber may enter, for example, a home shopping selection or a pay-per-view service request. For remote meter reading, alarm, and energy management services, sensing, measurement, energy control and other devices are appropriately dispersed in a subscriber's premises. Access to the cable distribution plant is provided by a data transmission modem for both subscriber service request data, entered via the keyboard, and utility or alarm data. The data is typically transmitted as frequency shift keyed or phase shift keyed data modulated on a carrier in the 5–30 megahertz band.

As an alternative to FSK or PSK data transmission, spread spectrum techniques and alternative arrangements such as telephone return have been proposed in cable television systems primarily because of the notorious susceptibility of the 5–30 megahertz band to noise and other interferences. A detailed discussion of the problems of return path transmission is provided in U.S. Pat. No. 4,912,721 entitled "Cable Television Spread Spectrum Data Transmission Apparatus."

While arrangements as mentioned above are known for providing on-premises equipment for transmitting data over a reverse path to a headend, there remains a requirement for off-premises reverse path equipment, responsive to the on-premises equipment, for controlling off-premises service providing system equipment such as descrambling or decoding, trap and interdiction system equipment. Furthermore, there remains a requirement in the art of design of cable television equipment for off-premises reverse path equipment responsive to, and which may be shared in common by, a plurality of subscribers and thus provide a cost-effective efficient arrangement. Also, there exists a requirement in the art for off-premises reverse path equipment to provide a bi-directional addressed data transmission path to each subscriber and a uni-directional transmission path toward the headend (relying on existing in-band or out-of-band downstream data transmission).

SUMMARY OF THE INVENTION

It is an object of the present invention to provide efficient, cost-effective off-premises cable television reverse path equipment for providing a reverse, upstream transmission path from a subscriber to a headend of a cable television system.

It is a further object of the present invention to provide an off-premises cable television reverse manifold system for combining a plurality of reverse path signals for transmission to a cable television system headend.

It is a further object of the present invention to provide off-premises cable television reverse path equipment, responsive to on-premises subscriber equipment for controlling off-premises cable television service providing equipment.

It is a further object of the present invention to provide off-premises cable television reverse path equipment providing bi-directional data transmission to on-premises subscriber equipment and uni-directional data transmission toward a cable television head end.

In accordance with achieving the objects of the present invention, it is a principle thereof to provide off-premises reverse path equipment at the location of off-premises cable television service providing equipment. Off-premises is intended to mean an equipment site off the premises of a subscriber, for example, on a pole, in a pedestal or in an equipment closet of a multiple dwelling unit. "Off Premises" also is intended to include locations not within a premises such as housings for equipment mounted to an exterior wall of the premises. In particular, at locations where any such cable television service providing equipment serves a plurality of subscribers, the reverse path equipment operates as a manifold for combining a plurality of upstream or reverse path communications from the plurality of subscribers for transmission toward the headend.

In one embodiment implemented in an off-premises interdiction system as first suggested in U.S. Pat. No. 4,912,760 by West et al., a first pay-per view or other special service unit may be provided in the subscriber premises including a pair of filters for separating forward and reverse transmission paths. A second special service unit is provided with common circuitry and includes a signal combiner for combining reverse path signals from a plurality of subscribers for transmission toward the headend. In the event signals could not be combined and forwarded, a data transmitter was to be provided at the common circuitry for coordinating data transmission to the headend. Alternatively, a return telephone path was suggested. Correspondence was suggested between the special service module at the subscriber premises and the special service module of the common circuitry. Also, it was suggested that power could be provided up the drop to the common circuitry for powering the common circuitry and special service module.

Altogether then, three embodiments were suggested in West et al. which are discussed in detail in accordance with the present invention: a first embodiment for simply combining signals at the common circuitry from a plurality of subscribers, a second embodiment in which return path transmission is provided over telephone lines, and a third embodiment in which a second data transmitter is applied for reverse path transmission.

In the first embodiment involving a signal combiner and according to the present application, a diplex filter is associated with each subscriber module and a common diplex filter is provided at the distribution plant side of common circuitry. Each diplexer provides separate forward and reverse transmission paths. A forward transmission path is provided through the common circuitry toward each of the four subscribers. The reverse transmission path is provided through the signal combiner toward the headend. In addition, a bandpass filter, an RF switch or both are provided for noise isolation and for limiting data transmission to particular, predetermined narrowband channels to avoid particularly noisy bands of the 5-30 megahertz spectrum. While a subsplit frequency allocation is discussed involving a 5-30 megahertz reverse path herein, the principles of the present invention are equally applicable to mid-split and other two way frequency allocations or other two way transmission arrangements known in the art.

In accordance with a second embodiment of the present invention, a telephone return path is provided. Nevertheless, data transmission between the subscriber and the off-premises common and subscriber equipment is provided for a number of reasons. For example, for impulse pay-per-view services, the subscriber requests service through on premises equipment located within the subscriber's premises. The request is transmitted up the subscriber drop to the off-premises subscriber module and common circuitry. A microprocessor of either the common circuiting or off-premises subscriber equipment determines if the subscriber has credit and immediately authorizes reception. A downstream data path is then used to confirm authorization to the subscriber. Meanwhile, a telephone return path from the subscriber to the headend is utilized to transmit program and billing information to the headend according to store and forward techniques known in the art. In this embodiment, an immediate return of data to the headend is not required for service. If the subscriber orders service during a program, the subscriber will be able to immediately view the program.

Other features of providing a data transmission path to the off-premises equipment may include the opportunity for a subscriber to control the off-premises common circuitry or subscriber equipment module. For example, in our previous application, we suggested that the subscriber module may comprise a variable stepped gain radio frequency amplifier for providing any reasonable power level of the incoming service providing signal to a particular subscriber. Under subscriber control, for example, if the subscriber obtains an additional television receiver, the subscriber may control the off-premises radio frequency amplifier to provide additional compensating gain. The subscriber initiates data transmission to and from the off-premises equipment which establishes a new amplifier gain level via the reverse path manifold system of the present invention. The new gain level is confirmed on a display of an on-premises subscriber console.

In accordance with a still further embodiment of the present invention, an RF data transmitter is provided at the reverse manifold apparatus of the present invention for return data transmission. The return data transmission may be spread spectrum, FSK at a particular carrier frequency within the 5-30 megahertz spectrum or may by via a plurality of predetermined channels to assure data reception in the presence of noise.

These advantages and features of the present invention, a reverse manifold system for providing communication with off-premises service providing subscriber and common circuit equipment and/or a return data transmission path to a headend will be discussed in the following detailed description of the present invention with reference to the drawings.

DETAILED DESCRIPTION OF THE INVENTION

Now the reverse manifold system of the present invention will be discussed in the context of the off-premises cable television channel interdiction apparatus first disclosed in U.S. Pat. No. 4,912,760, filed Mar. 10, 1988, the disclosure of which is herein incorporated by reference. On the other hand, the present invention is in principle not limited to reverse manifold apparatus for an interdiction system but is also applicable to reverse manifold apparatus provided generally in any off-premises service providing system, for example, positive and negative trap systems, synch suppression systems and in any other system in which service is provided to a plurality of subscriber units from an off-premises site.

A detailed discussion of the interdiction system in which the present invention may be implemented is provided in U.S. Pat. No. 4,912,760, U.S. patent application Ser. No. 279,619, and in the related copending applications. Topics related to interdiction systems such as jamming frequency control will not be addressed in great detail herein.

Figure 1:
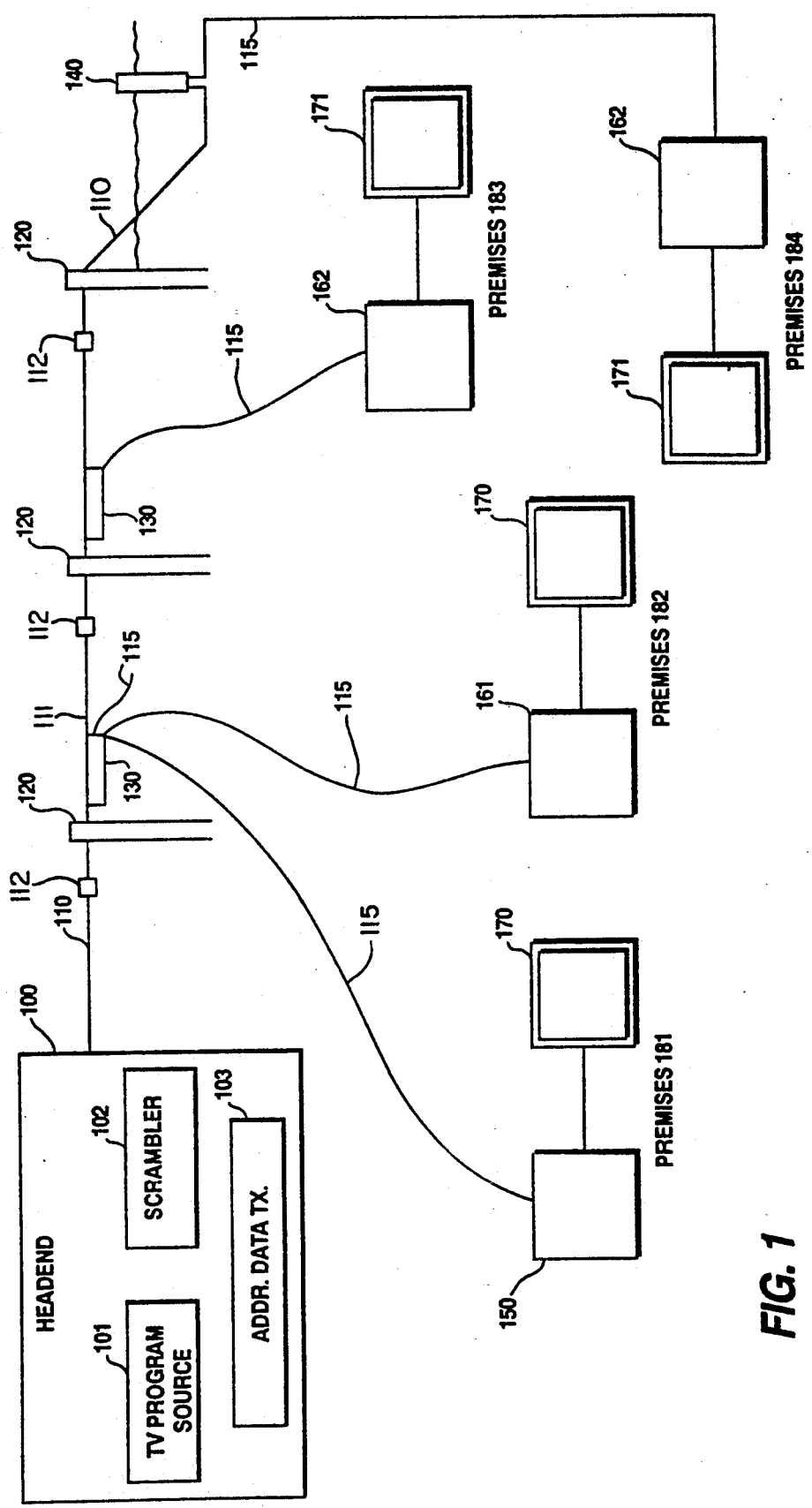
FIG. 1 is an overall system block diagram of a typical two way cable distribution plant showing an off- or on-premises cable television system including two way distribution amplifiers 112 in which system the present off-premises CATV reverse manifold system may be implemented, i.e. an interdiction cable television system.

Referring more particularly to FIG. 1, there is shown a general block diagram of a cable television system employing the principles of the present invention. By cable television system is intended all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber, when used in this application and the claims, refers to either a private subscriber or a commercial user of the cable television system. Headend 100 as used in the present application and claims is defined as the connecting point to a serving cable or trunk 110 for distributing television channels over feeder line 112 to drop 115 and finally to subscriber locations. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal amplitude modulated onto a radio frequency center is generally considered in the following description; however, the principles of the present invention apply equally to other standard and non-standard baseband standard definition and proposed high definition television signal formats.

Headend 100 comprises a source of television programming 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 110 and subsequently over feeder line 112 and drop line 115.

Conventionally, trunk line 110, feeder line 111, and drop line 115 are constructed of coaxial cable. For higher performance, any one of these lines could be a fiber optic cable. Preferably, due to the cost of the installation and the need for a high quality initial transmission from headend 100, trunk line 110 is typically the only line constructed of fiber optic cable.

Program material provided by source 101 may be premium or otherwise restricted or desirably secured from receipt at unauthorized receiver locations. To this end, each channel or program to be secured is generally scrambled by scrambler 102 provided at headend 100. By the use of the term premium channel or premium programming in the present application and claims is intended a channel or program which is desired to be secured from unauthorized receipt either because of its premium or restricted status.

Normally, all premium programming in known cable television systems is scrambled. However, in accordance with interdiction system technology, premium programming is transmitted in the clear, and interdiction is applied at off-premises interdiction or other off-premises apparatus 130 to jam reception of unauthorized premium programming. The present invention for providing a reverse data transmission path is generally housed at apparatus 130.

Consequently, during a transition period in which headend 100 provides scrambled television programming as well as premium programming in the clear, a scrambler 102 will be provided so long as converter/decoders 150 are provided to subscribers for unscrambling scrambled program transmission. In certain instances, converter/decoders 150 may be entirely replaced by interdiction apparatus 130 of the present invention. Also, descrambling or decoding equipment may be provided at off-premises housing 130.

Also, at the headend, there is normally an addressable data transmitter 103 for transmitting global commands and data downstream to all subscribers or forward addressed communications for reception by a unique subscriber. Such forward data transmission may be conducted over a separate data carrier from the cable television spectrum, for example, at 108.2 megahertz. It may also be transmitted over an unused default channel in the television spectrum. Global commands generally take the form of operation code and data while addressed communications further comprise the unique address of a particular subscriber.

In another alternative embodiment, such communications may take the form of in band signals sent with a television channel superimposed upon an audio carrier during a special time period, for example, a period corresponding to the vertical blanking interval of the associated video signal. Such data communications further complicate data reception at interdiction apparatus 130 and are desirably eliminated. However, in band signaling is sometimes required for the operation of certain converter/decoders 150 known in the art.

Commands then to authorize service to a particular subscriber may be transmitted in-band or on a separate data carrier and typically involve transmitting a unique address of a particular subscriber unit, a command, and data. The decoder 150 receive the command, decode it, determine if the command is to be acted on, and if so perform the desired action such as providing a subscriber with pay-per-view credits or generally authorizing services.

Consequently, headend 100, cable television serving cable or trunk line 110, and converter/decoders 150 and television receivers 170 at a typical subscriber premises 181 comprise a typical known cable television system. Channel program or authorization data is transmitted via an addressable data transmitter 103 over a trunk line 110 to feeder line 111. At a pole 120 or from a pedestal 140 at underground cable locations, the serving signal is dropped via drop 115 to a subscriber location. Drop 115 is connected to a conventional converter/decoder 150 which serves several functions. Responsive to an addressed communication from headend transmitter 103, channel or program authorization data is updated in an authorization memory if the address associated with the addressed communication matches a unique address of the subscriber decoder 150. For example, the subscriber address may comprise a plurality of bits over and above the actual number of subscribers in a system, additional bits insuring the security of the address. The premium channel or program is then stored in the authorization memory of the converter/decoder 150. Television programming is normally converted to an otherwise unused channel such as channel 3 or 4 of the television spectrum by a converter portion of converter/decoder 150. Its premium status is checked against the data stored in authorization memory. If the programming is authorized, the decoder portion of the converter/decoder is enabled to decode authorized scrambled premium programming.

The provided television receiver may be a conventional television receiver 170 or may be a so-called cable ready television receiver 171. Because of the advent of cable ready television receivers 171, there is no longer a requirement at a subscriber premises 181 for the converter portion of the converter/decoder 150 as a converter is built into such television receivers.

In accordance with a cable television system provided with interdiction or other off-premises apparatus 130 of FIG. 1, a housing is mounted on a strand supporting cable 111, to a pole 120, or provided via a pedestal 140. Although not shown, the housing 130 may also be mounted indoors in an equipment closet of a multiple dwelling unit. Inside the housing is common control circuitry for tapping into the broadband television and data transmission spectrum. Referring to the first pole 120 from the left of FIG. 1, there is shown a strand-mounted apparatus serving two drops 115 to subscribers. Altogether, four or more subscribers and up to four or more drops 115 may be served by interdiction apparatus 130. (Four is a practical number but the invention is equally applicable to equipment serving a much greater number of subscribers such as might be found in multiple dwelling unit installations.) Besides the common control circuitry, four or more plug-in subscriber modules may be provided for one off-premises housing. Also, according to the present invention, additional services requiring two way data transmission such as subscriber polling, home shopping, burglar alarm, energy management and pay-per-view services may be provided via a reverse manifold system of apparatus 130 according to the present invention.

Desirably, all equipment 161 may be removed from the subscriber premises 182. However, for the provision of certain additional services, some on-premises equipment may be unavoidable. Furthermore, some return path equipment from the pioneer days of two way cable systems may exist which should be compatible with a reverse manifold system provided at housing 130.

For purposes of this description, premises 182 will be assumed to include at least one non-cable ready conventional television receiver 170. Consequently, subscriber equipment 161 must at least comprise a tunable converter for converting a received cable television channel to an unused channel such as channel 3 or 4 for reception on conventional television receiver 170. According to the present invention, the device comprises data entry means, data confirmation means, and a data transceiver coupled to each of these. The on-premises device may further comprise a return telephone path to the headend to supplement or replace a return path via the cable distribution plant to the headend 100.

Power for off-premises apparatus 130 may be provided over the cable from the headend 100 or be provided via the subscriber drop 115 or by a combination of such means. Foreseeably, power may be even provided by rechargeable means such as solar cells or other external or replaceable internal sources such as batteries. Consequently, subscriber equipment 161 may also comprise a source of power for off-premises interdiction apparatus 130.

All off-premises service providing apparatus 130 may be secured in a tamper-resistant housing or otherwise secured such as in a locked equipment closet of an apartment complex. If located in a place exposed to the elements, the housing should be water-tight. Also, the housing should be designed to preclude radio frequency leakage.

At premises 183, the subscriber is presumed to have a cable ready television receiver 171. Consequently, on premises subscriber unit 162 may be entirely eliminated or comprise simply a power feed to interdiction apparatus 130 if no two way data communication with off-premises equipment 130 or headend 100 is required.

Premises 184 pictorially represents a subscriber location served by an underground cable 110 via a of pedestal 140, in which interdiction apparatus 130 is located. Pedestals are generally used from housing cable distribution amplifier equipment in buried cable installations. In accordance with the present invention, pedestal 140 may comprise an off-premises housing for reverse manifold and interdiction apparatus 130. Subscriber equipment 162 may comprise a converter, a diplexer according to the present invention and a power unit as described in reference to subscriber equipment 161 or nothing at all as described in reference to subscriber equipment 162.

Interdiction apparatus 130 is uniquely addressable by headend 100 just as is converter/decoder 150. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form. Nevertheless, address security may be desirable so long as converter/decoders 150 or other unique address requisite equipment is provided at a premises.

Interdiction apparatus 130 comprises addressable common control circuitry and up to four plug-in subscriber modules. Upon receipt of subscriber specific premium program, subscriber credit or channel authorization data, the data are stored at off-premises interdiction apparatus 130. Interdiction apparatus 130 further may comprise a diplexer for providing a forward transmission path which is coupled to automatic gain control circuitry of the common control circuitry. The gain circuitry passes the downstream authorization data transmission to a subscriber module. Channel interdiction circuitry associated with each subscriber module then selectively jams unauthorized premium programming dropped via a particular drop 115 to a particular subscriber. Consequently, interdiction apparatus 130 is reasonably compatible with downstream addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises apparatus 130 or derive a signal from shielded and bonded cables 110, 111 which should likewise be maintained secure from radio frequency leakage.

Two way data transmission may be provided via a so-called subsplit frequency spectrum comprising the band 5-30 megahertz for upstream, reverse path transmission toward headend 100 and a spectrum from 54-550 megahertz for downstream forward transmission or other two way arrangements known in the art. Distribution amplifiers 112 distributed along the distribution plant according to known prior art design techniques separate and separately amplify the two transmission bands. They are distributed along the transmission path in a manner so as to preclude the carrier-to-noise ratio of either transmission path from being too low. Even with such design techniques, the return path is highly susceptible to interference at any point as is described in U.S. Pat. No. 4,912,721 of the same assignee, entitled "Cable Television Spread Spectrum Data Transmission Apparatus."

Figure 2:
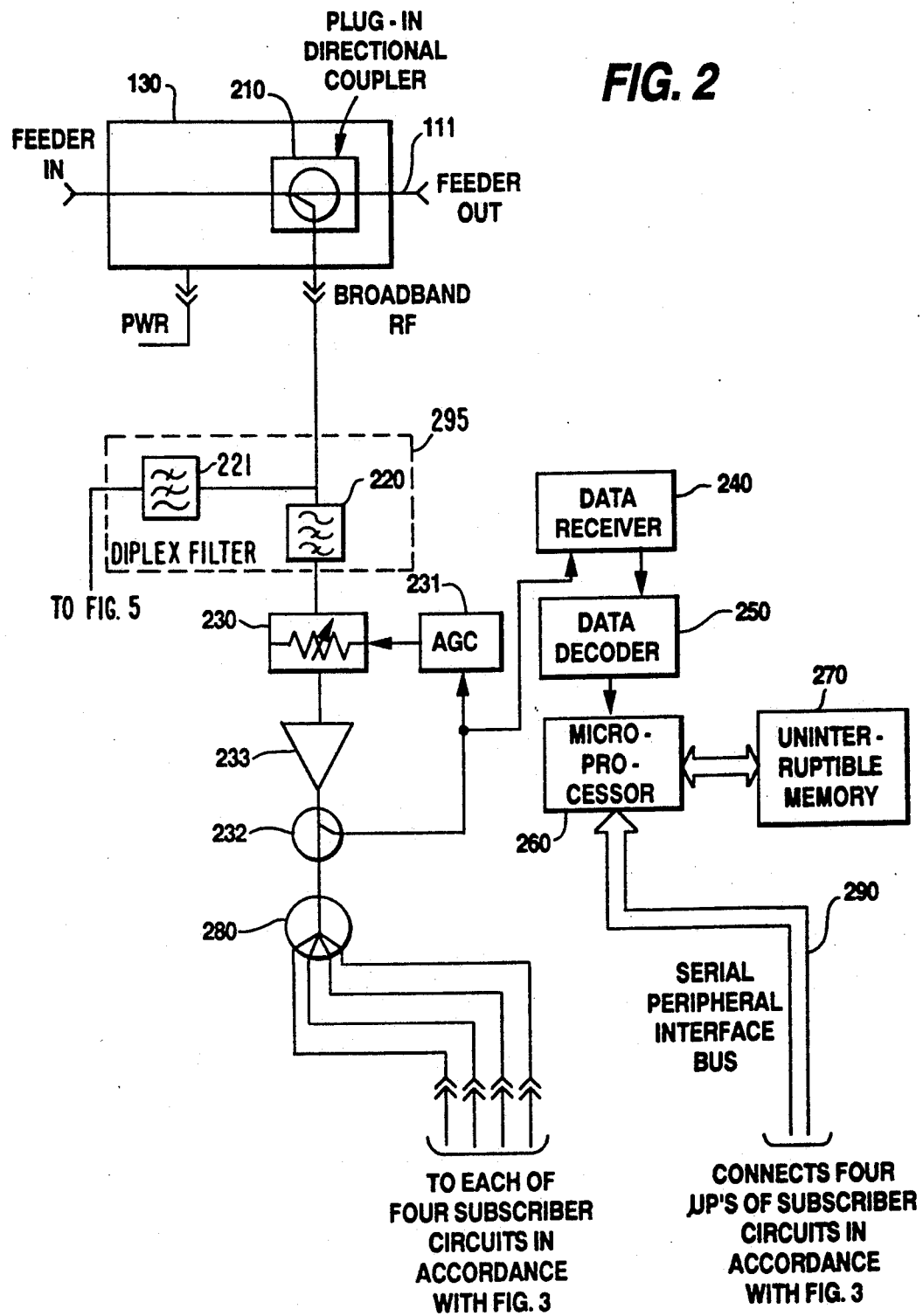
FIG. 2 is a block schematic diagram of an addressable common control circuit for a plurality of provided subscriber modules of an off-premises interdiction system comprising a broadband signal tap, a diplexer connected to the tap, a microprocessor, a data receiver and decoder, and an automatic gain control circuit.

The common control circuitry of interdiction apparatus 130 will now be described by means of the block diagram FIG. 2 for serving four subscriber modules in accordance with the block diagram FIG. 3. Referring particularly to FIG. 2, a feeder cable 111 is shown entering off-premises interdiction apparatus 130 at FEEDER IN and leaving at FEEDER OUT. Power PWR may be provided via the feeder cable, by means of the subscriber drop or locally by internal or external means. Depending on the source of power PWR, input power may be of alternating or direct current.

A directional coupler 210, which may be in the form of a plug-in module taps into the broadband serving cable 110. A broadband of radio frequency signals is thus output to highpass filter 220 of diplex filter 295. Highpass filter 220 passes a downstream band of frequencies, for example, 54-550 megahertz comprising at least the cable television spectrum and any separate data carrier frequency and blocks the upstream band of frequencies, for example, 5-30 megahertz (in a bi-directional application). For an off-premises interdiction system, the cable television spectrum may particularly comprise a frequency band from about 54 MHz to 550 MHz.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits. The common circuitry of FIG. 2 is co-located or closely located to the subscriber units which will be further described in connection with FIG. 3 or the reverse manifold apparatus according to FIGS. 5, 6 and 7 and may be contained in the same housing.

Also connected to directional coupler 232 is a data receiver 240 for receiving downstream forward data transmissions from the addressable data transmitter 103 located at headend 100. Data receiver 240 receives data transmitted, for example, over a data carrier of 108.2 megahertz and provides unprocessed data to data decoder 250. In accordance with an established protocol and as briefly described above, such data may be in the form of an operation code (command), a subscriber unique address and associated data. Data decoder 250 processes the data and provides the separately transmitted data to microprocessor 260 for further interpretation in accordance with a built-in algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Received data may be stored in non-volatile memory 270 by microprocessor 260. Data may be temporarily stored or more permanently stored in memory 270 and subsequently downloaded when needed to a subscriber module according to FIG. 3 via a serial peripheral interface bus connecting microprocessor 260 with separate microprocessors 300 associated with each provided subscriber module as shown in FIG. 3.

Variable gain unit 230 regulates the received broadband of picture carriers to the above-described reference level while the microprocessor 260 controls the jamming carrier output levels of associated subscriber units within the prescribed range. Microprocessor 260 consequently interprets both global communications addressed to common control circuitry or communications addressed to unique subscriber modules such as service credit or authorization commands or both. If appropriate, microprocessor 260 ignores global or addressed communications to other interdiction apparatus 130 or to converter/decoders 150 (FIG. 1). Examples of global communications peculiar to interdiction apparatus 130 are premium channel frequency data and jamming factor data for each premium channel or channel over which premium programming at a particular point in time is provided via headend 100. Examples of addressed communications include communications comprising premium channel or programming authorization information or communications instructing the common control circuitry to provide credit to a particular subscriber.

Figure 5:
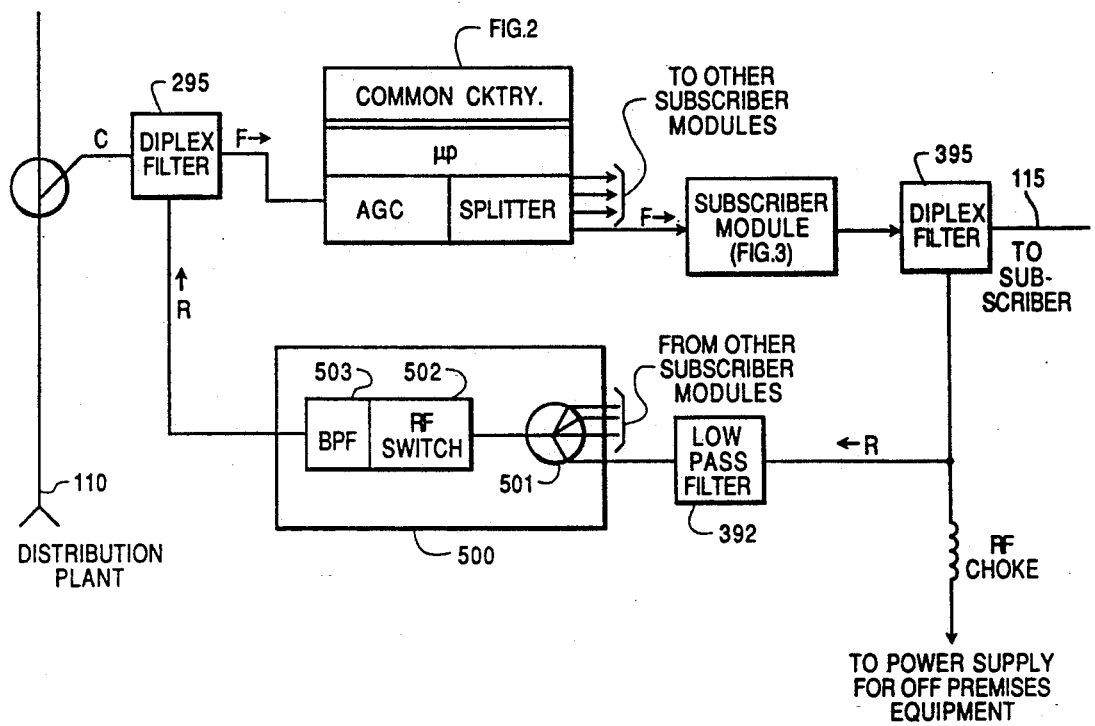
FIG. 5 is a block schematic diagram of a first embodiment of a reverse manifold system 500 according to the present invention and its connecting relationship with the circuitry of FIGS. 2 and 3.
Figure 6:
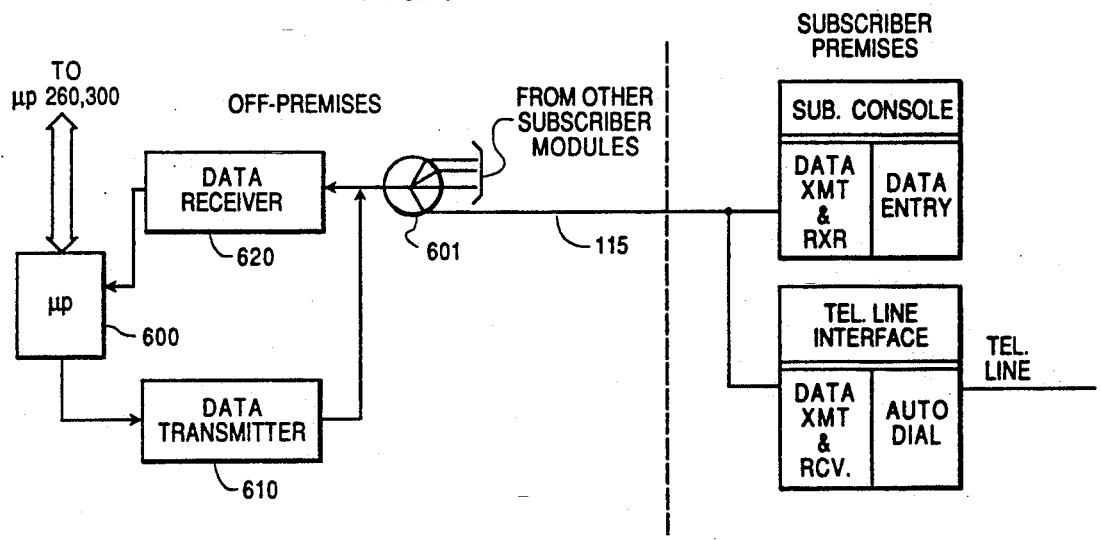
FIG. 6 is a schematic block diagram of a second embodiment of a reverse manifold system according to the present invention in which impulse pay-per-view and other services are provided over a telephone path and in which embodiment the subscriber may control the common circuitry of FIG. 2 or the subscriber module according to FIG. 3.
Figure 7:
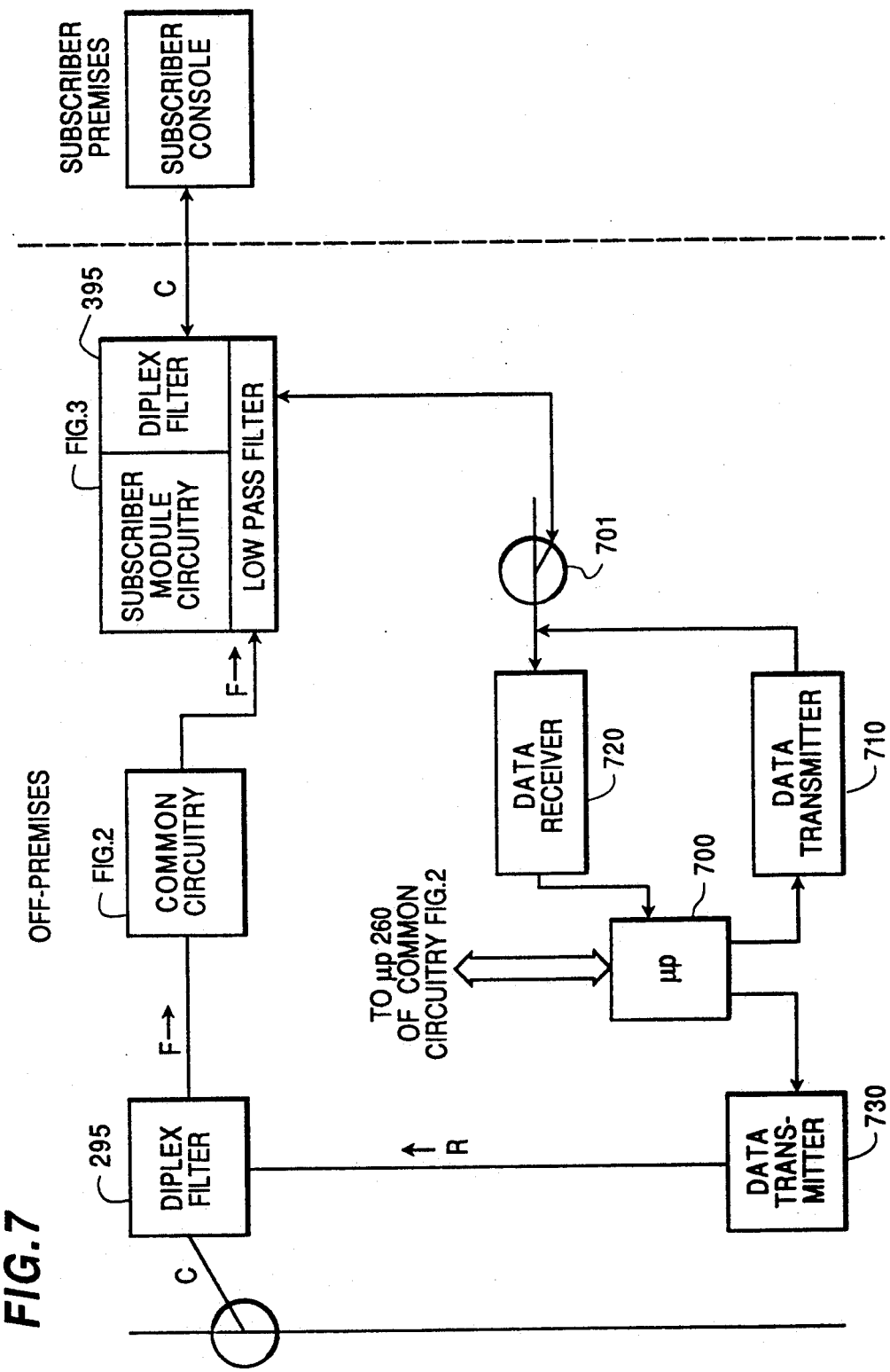
FIG. 7 is a schematic block diagram of a third embodiment of a reverse manifold system whereby return path data transmission is provided by a radio frequency data transmitter.

If two way services over the serving cable are anticipated, the radio frequency upstream transmissions from on-premises equipment are combined at a reverse manifold system according to FIG. 5 for upstream transmission. Alternatively, a separate data transmitter may be provided in the reverse manifold apparatus according to FIG. 7 or a separate telephone link from the subscriber location to the headend may be provided as per the reverse manifold apparatus of FIG. 6. FIGS. 5, 6 and 7 will be discussed is particular detail subsequently.

Serial peripheral interface bus 290 may be a two way communications link by way of which link microprocessors 300 (FIG. 3) associated with subscriber modules may, at least, provide status reports to microprocessor 260 upon inquiry. Microprocessors 600, 700 of either FIGS. 6 or 7 may tap into this bus 290 and bid for communication to either a microprocessor 260 of common equipment or a microprocessor 300 of subscriber equipment or may directly communicate with either type of microprocessor over a separate bus.

Radio frequency splitter 280 provides broadband radio frequency signals comprising a broadband cable television service spectrum separately to each subscriber module that is provided.

According to the present invention, a reverse path is required at least to the common circuitry of FIG. 2 for special additional services. Consequently, a signal combiner of a reverse manifold module according to FIGS. 5, 6 or 7 is provided for receiving data communications from each of the four subscriber modules in an opposite manner to splitter 280. Certain data may be transmitted back toward the headend via an RF return path according to either FIGS. 5 or 7 and a forward transmission path toward the subscriber may be provided in a conventional manner according to FIG. 5 or over a different downstream path according to either FIGS. 6 or 7.

Figure 3:
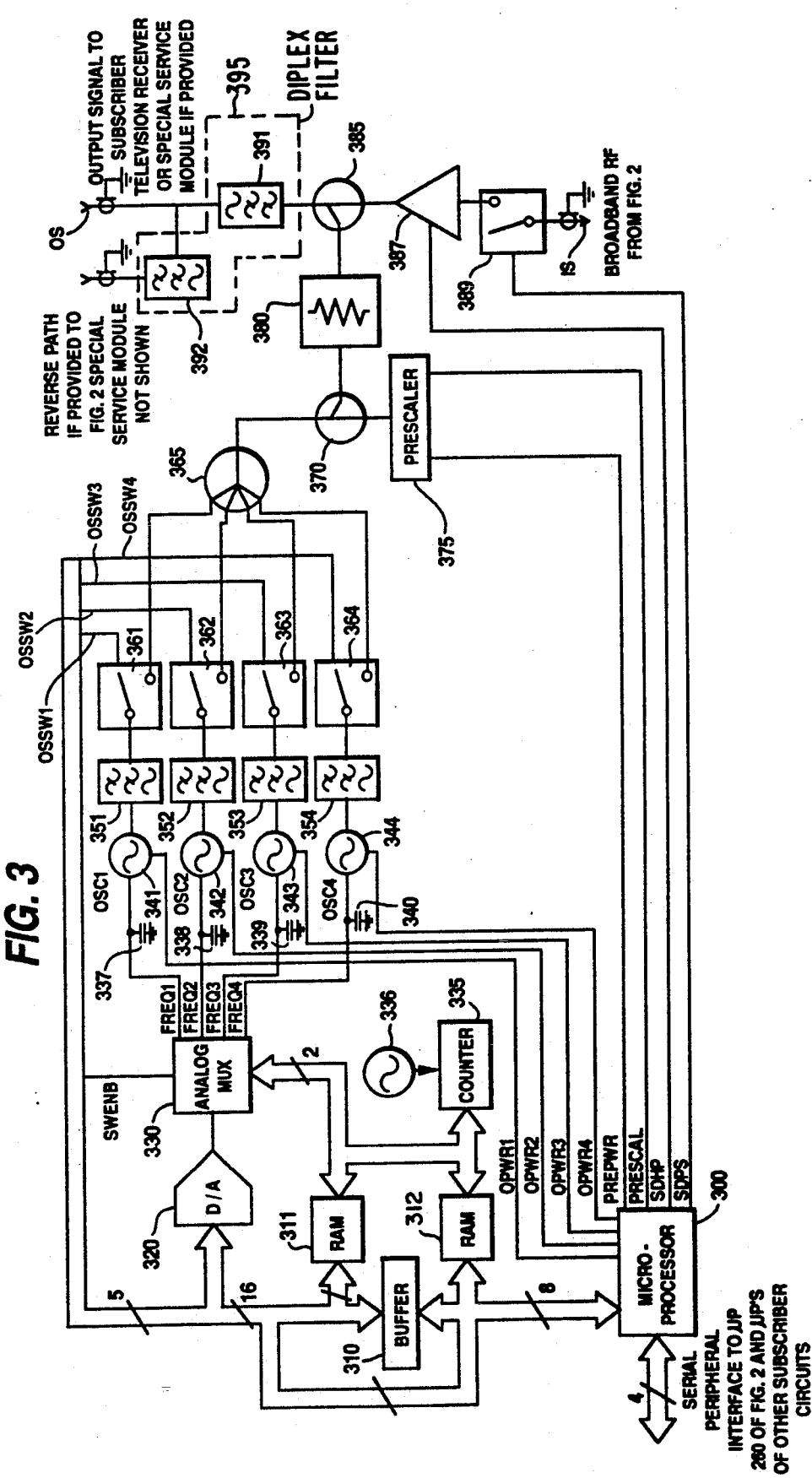
FIG. 3 is a block schematic diagram of one subscriber module of an off-premises interdiction system comprising a microprocesor 300 for selectively controlling the jamming of unauthorized services to a subscriber, associated jamming equipment and a diplexer.

Referring more particularly to FIG. 3, there is shown an overall block schematic diagram of a subscriber module including a diplexer 395 in accordance with the present invention. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 260. Consequently, microprocessor 300 may conveniently comprise a Motorola 68HC05C3 microprocessor or similar unit.

A reverse path may be provided via a lowpass filter 392 of diplex filter 395 to a reverse manifold module (according to one of FIGS. 5, 6, or 7) co-located with common control circuitry as described in FIG. 2 and subscriber modules according to FIG. 3. Thus, a 5-30 megahertz or other lowpass band may be provided for upstream, reverse transmissions from corresponding subscriber equipment on the subscriber premises. Such a reverse path is completed to the subscriber via terminal OS. Also, power may be transmitted up the subscriber drop to the subscriber module of FIG. 3 and withdrawn at terminal OS as will be further described in connection with FIG. 5.

The broadband radio frequency television spectrum signal from FIG. 2 is provided to terminal IS. Referring to the path connecting terminal IS to terminal OS, there are connected in series a service denying switch 389, a radio frequency amplifier 387, a jamming signal combiner 384, and a high pass filter 391.

Service denying switch 389 is under control of microprocessor 300. In the event of an addressed communication from headend 100 indicating, for example, that a subscriber is to be denied service for non-payment of a bill, service denying switch 389 may be opened. In addition, a high frequency amplifier 387 may be powered down under control of microprocessor 300 whenever service is to be denied. Otherwise, amplifier 387 may be set at discrete gain levels, under microprocessor control, to provide supplemental gain to the broadband television signal if a subscriber has a plurality of television receivers over and above a nominal amount. This feature will be further described in connection with FIG. 6 and is equally applicable to FIG. 7.

An appropriate control signal waveform output SDPS is provided by microprocessor 300 for controlling switch 389. Also the same on/off control signal that is used to control the switch 389 may control the powering up and down of amplifier 387 as control signal SDHP.

Continuing the discussion of FIG. 3, jamming signals are introduced at directional combiner 385 under microprocessor control. Because of the directional characteristic of radio frequency amplifier 387, jamming signals cannot inadvertently reach the common control circuitry of FIG. 2 or the serving cable 110, 111. Highpass filter 391 of diplex filter 395 prevents any return path signals from reaching combiner 385 and passes the broadband spectrum including any jamming signals toward terminal OS. Reverse path signals, for example, in this embodiment may be radio frequency signals below 30 megahertz. The broadband television spectrum is presumed to be in the 54-550 megahertz range. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300, responsive to common microprocessor 260, controls the frequency and power level outputs of four (or other quantity) voltage controlled oscillators 341-344, each of which oscillators jams premium channel frequencies within an allocated continuous range of frequencies. The frequency of the oscillators is set over leads FREQ1-4 in a manner described in U.S. application Ser. No. 166,302. A power level and on/off operation of the oscillators 341-344 are controlled over leads OPWR1-4.

Since premium programming may be transmitted anywhere in the cable television spectrum, the sum of all such allocated portions comprises the entire television spectrum to be jammed (even where non-premium channels are normally transmitted). Also, in accordance with the depicted interdiction system, the television spectrum to be jammed may comprise discontinuous portions or intentionally overlapping portions.

A further detailed discussion of frequency control and the interdiction system of FIGS. 1, 2, and 3 may be found in U.S. Pat. No. 4,912,760 and U.S. application Ser. No. 279,619.

Figure 4:
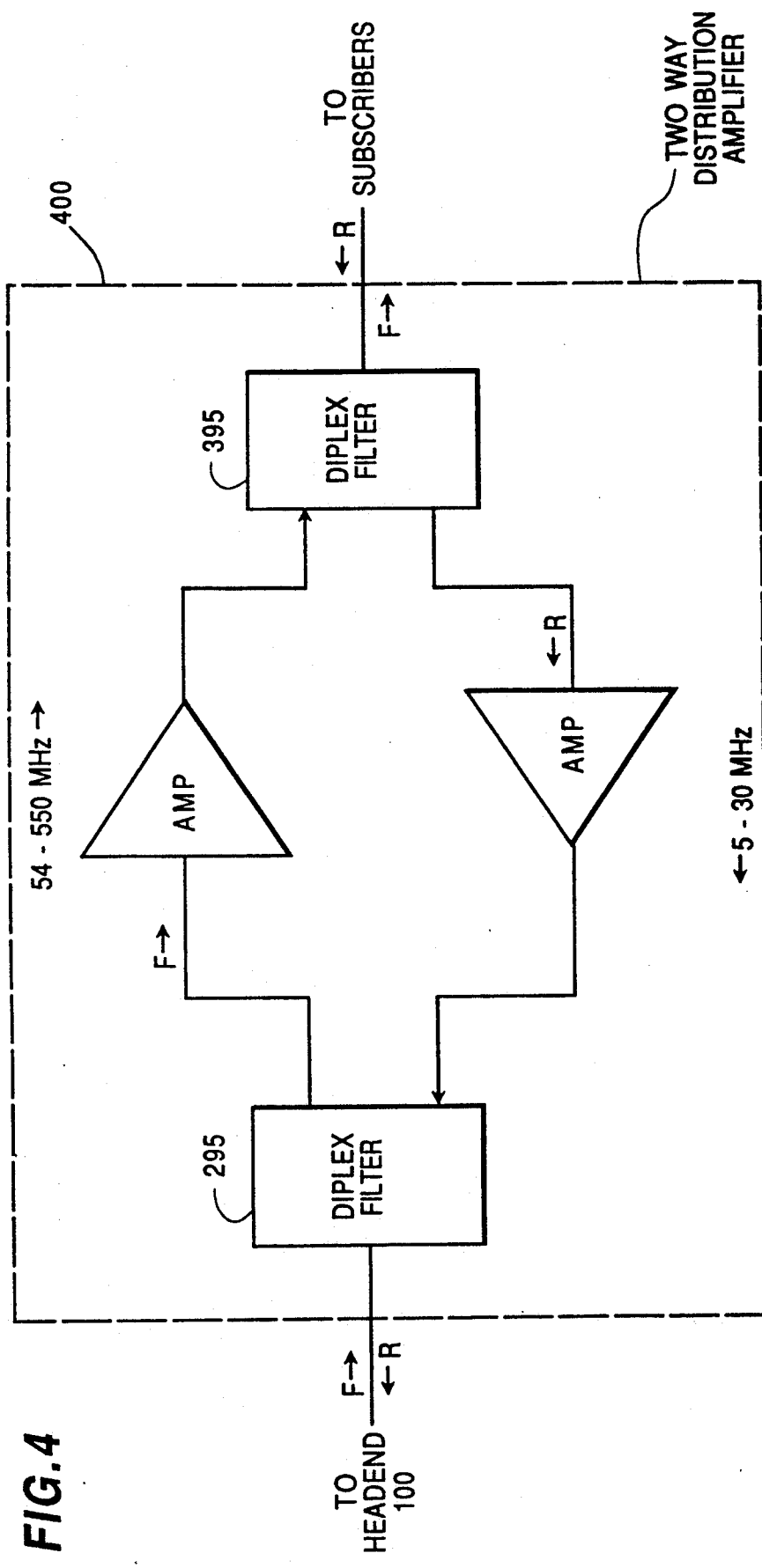
FIG. 4 is a block schematic diagram of a typical two way distribution amplifier 112 shown in FIG. 1 showing diplex filters for separating forward and reverse transmission paths.

Referring now to FIG. 4, there is shown a schematic block diagram of a two way cable distribution amplifier 400 which provides more particular detail of one such amplifier 112 shown in FIG. 1. In connection with the discussion of FIG. 4, and by way of convention, a forward or downstream transmission path toward a subscriber is represented F; an upstream or reverse path toward headend 100 is denoted R; a combined path where both upstream and downstream communications are present is denoted C.

Two way distribution amplifier 400 comprises diplex filter 295 for separating a combined path input at the left into separate forward and reverse paths F and R. A forward amplifier amplifies the 54-550 megahertz spectrum, by way of example, while a reverse amplifier amplifies the 5-30 megahertz upstream spectrum. These frequency bands are provided by way of example only and the principles of frequency multiplexing may be applied to any frequency bands or collection of bands for providing first and second directions of transmission.

In a similar manner to diplex filter 295, diplex filter 395 combines the forward and reverse amplifier output and input respectively. A combined signal then is provided toward the subscribers. Thus, diplex filter 295 and diplex filter 395 provide communication paths toward the headend 100 and subscriber respectively. It is a principle of the present invention to provide one diplex filter 295 between directional coupler 210 and common circuitry according to FIG. 2. It is a further principle of the present invention to provide a diplex filter 395 associated with subscriber equipment modules according to FIG. 3. In a plug-in slot of off-premises equipment 130 and coupled to each diplexer 295,395 is a reverse manifold system according to one of the embodiments according to FIGS. 5, 6 or 7.

Referring now to FIG. 5, there is shown a block schematic diagram of a first embodiment of a reverse path manifold system 500 according to the present invention. Reverse path manifold system 500 is coupled between diplex filter 295 of common circuitry of FIG. 2 and each diplex filter 395 of subscriber circuitry according to FIG. 3. A low pass filter of diplex filter 295 precludes any forward downstream singals from entering manifold system 500 but permits a reverse path signal to obtain access to cable plant 110 and proceed on to headend 100 via a directional coupler.

If power is provided up a customer drop 115, an RF choke is provided and coupled to the low pass (including DC or 60 hertz AC) side of diplex filter 395. The RF choke precludes RF from entering a local power supply for powering all off-premises equipment 130 requiring power. Low pass filter 392 only passes higher frequencies than 60 hertz and frequencies less than, for example, 30 megahertz or may be restricted to the subsplit 5-30 megahertz band or to an even narrower bandwidth data channel such as an FSK channel of 50 kilohertz width at 12 megahertz. In some instances, low pass filter 392 may be a band pass or channel pass filter. The low pass filter 392 is provided on a per subscriber basis and may be a part of a subscriber module according to FIG. 3 and may be a portion of diplexer 395.

Diplexer 395 receives a combined band of frequencies from a subscriber drop and separates forward F and reverse R transmission paths as shown. The forward downstream path F output of diplexer 295 proceeds via common circuitry according to FIG. 2 to at least one, preferably four, and perhaps five or more subscriber modules according to FIG. 3 via a signal splitter. The output of one such subscriber module is shown proceeding via diplex filter 395 to an associated subscriber via subscriber drop 115.

Reverse manifold apparatus 500 comprises a signal combiner 501 coupled between diplex filters associated with, as described above, at least one, preferably four, and perhaps five or more subscribers and a diplex filter 295 associated with the common circuitry. Upstream data transmission may be frequency multiplexed to provide a number of slow speed data channels, each being associated with one or shared by only a handful of subscribers. In this instance, low pass filter 392 is a data channel pass filter tuned to a particular channel associated with the particular subscriber. Filter 392 also provides noise isolation for the upstream path from any power supply noise or other noise outside the pass band.

Reverse manifold system 500 thus combines a plurality of upstream data transmissions for upstream transmission from all associated subscriber modules. Also associated with signal combiner 501 is a bandpass filter 503 providing front end noise isolation and passing an entire passband of frequencies toward diplexer 295 including all those data channels combined at combiner 501. In alternative embodiments, filter 503 may comprise a low pass or band stop filter so long as upstream communications combined via combiner 501 are passed to headend 100.

RF switch 502 provides an additional or alternate layer of isolation if required. RF switch is triggered by the presence of RF signals for upstream transmission and consequently gates any such signals toward diplexer 295.

While a reverse manifold system according to FIG. 5 successfully passes upstream data transmissions around any off-premises service providing equipment such as the interdiction system equipment depicted, provides considerable noise immunity, and further provides a means for obtaining power for subscriber or common circuits supplied over a customer drop 115, reverse manifold 500 provides no opportunity for subscriber control of common circuitry according to FIG. 2 or their associated subscriber module according to FIG. 3.

Referring now to FIG. 6, there is shown a block schematic diagram of a second embodiment of a reverse path manifold system which provides for considerable interaction between a subscriber and any off premises service providing equipment. In this exemplary embodiment of FIG. 6, no common circuitry nor subscriber circuitry is shown for convenience. On the other hand, on premises subscriber equipment is shown in greater detail including a telephone line return interface circuit 605.

According to FIG. 6, subscriber equipment includes a subscriber console 603 including a data transmitter and receiver and a data entry device. Furthermore, there may be dispersed about the premises a number of devices (not shown) for providing energy management control, burglar alarm and other services. The data entry device may be used for subscriber polling, home shopping and pay-per-view program purchase services. In this scenario, the subscriber votes, purchases displayed goods or subscribes to a pay-per-view event through the data entry device. For example, a subscriber may actuate a remote keyboard choice via infrared transmission to the subscriber console or may even simply orally request something whereby voice recognition algorithms known in the art may determine the ordering party by voiceprint identification and transfer the request data upstream.

The telephone line interface 605 accepts data for upstream transmission, stores it if necessary, automatically dials the headend 100, obtains confirmation, and proceeds to forward all request and billing data to the headend 100. Data transmission proceeds at a rate and in a manner consistent with the bandwidth provided by a standard telephone transmission line. In the reverse direction, the data transmitter may relay any data received from the telephone line to the subscriber console or the off-premises equipment.

Subscriber requests for pay-per-view services are combined in a similar manner at signal combiner 601 which is a bi-directional device. These are received at data receiver 620 decoded and provided to microprocessor 600 which may be a similar microprocessor to that provided for either microprocessor 260 or 300. Furthermore, microprocessor 600 need not be a separate microprocessor from microprocessor 260. Once microprocessor 260 confirms that a particular subscriber is creditworthy, microprocessor 600 signals data transmitter 610 to addressably transmit a buy confirmation signal which may be displayed at the subscriber console.

Data transmitter 610 may transmit data in a frequency multiplexed manner in spectrum shared with data receiver 620. There is little concern in the transmission up and down drop 115 over noise interference to the same degree as is experienced over the cable distribution plant generally. Consequently a 100 kilohertz baseband spectrum may be shared 50 kilohertz each for upstream and downstream communications between data transmitter 610, data receiver 620 and the subscriber premises equipment.

Data transmitter 610 may alternatively be provided in the downstream path of a subscriber module and thus transmit data to the subscriber premises in a known arrangement such as in band with a television signal or over a separate data carrier.

Also, according to FIG. 6 and referring briefly to FIG. 3, other features of subscriber control of off-premises service providing equipment are rendered feasible by the depicted embodiment. For example, a stepped gain radio frequency amplifier 387 of a subscriber module according to FIG. 3 may be controlled by the subscriber when the subscriber, for example, adds a new television receiver to their premises wiring. The subscriber enters a particular command at their subscriber console which is received at data receiver 620. The command is forwarded from data receiver 620 to microprocessor 600. Microprocessor 600 via processors 260 and 300 controls RF amplifier 287 to step up its output gain, the appropriate processor of processors 600, 260 or 300 having verified that the subscriber has initiated the command. A confirmation signal indicating that the gain has been incremented is returned via data transmitter 610 which may be displayed or otherwise inform the subscriber that the command has been executed.

In a similar manner but via the downstream data path from the headend 100, the gain of radio frequency amplifier 387 may be set or reset. Furthermore, cable television maintenance personnel may use a secure radio frequency or other communications device to communicate with the interdiction apparatus 130 to set or reset any variable parameters of the apparatus, including authorization data.

Thus, the reverse manifold embodiment of FIG. 6 is especially suitable for controlling off-premises service providing equipment for providing pay-per-view and home shopping services. A data return path for billing and program data, subscriber polling, energy management control and burglar alarm services is provided via a telephone line from the subscriber to the headend.

Referring now to FIG. 7, there is shown a block schematic diagram of yet another reverse manifold system which eliminates the telephone line return of FIG. 6 and provides in its stead an RF data return path. The reverse manifold system of FIG. 7 comprises a signal combiner/splitter 701, a data receiver 720, a microprocessor 700 and a data transmitter 710 just as in the embodiment of FIG. 6. In this embodiment, there is additionally included an RF data transmitter 730 for upstream data transmission.

The reverse path manifold system of FIG. 7 is shown coupled between subscriber equipment according to FIG. 3 including diplexer 395 and diplex filter 295 at the front end of common circuitry according to FIG. 2. No telephone line return path is shown for the subscriber console of FIG. 7 which primarily comprises a data modem and a data entry device.

The embodiment according to FIG. 7 operates in a similar manner to that of FIG. 6. However, all return data communications for all services are assumed to be provided via the reverse manifold system of FIG. 7. Home shopping, subscriber polling, burglar alarm and all other services are provided via the depicted circuitry and any associated data are relayed to headend 100 via RF transmitter 730. For example, an energy management control signal is received via the data receiver 240 of FIG. 2 from headend 100, interpreted by microprocessor 260 and relayed to microprocessor 700. Microprocessor 700 in turn actuates a data transmission to, for example, turn up or down a thermostat setting on the subscriber's premises. As an example of a reverse data direction, consider a burglar alarm which may be activated on the subscriber premises. The alarm may be formatted and modulated for transmission at the subscriber's premises up the drop to the data receiver 720. The message then is interpreted as such by the microprocessor 700 which then controls the RF data transmitter 730 to transmit an appropriate alarm message to the headend.

As with the example of FIG. 6, a subscriber may control common circuitry or subscriber circuitry as appropriate, for example, the RF power amplifier 387 of a subscriber module according to FIG. 3. As already described, the subscriber may set the gain of the amplifier depending on how their on premises television receiving equipment is arranged.

RF data transmitter 730 may transmit data in accordance with well known techniques on any data carrier in the subsplit band, for example, between 5 and 30 megahertz. However, such PSK or FSK data transmissions have been notoriously susceptible to noise interference which has been practically impossible to avoid over time. Once a clear channel is uncovered, the next day, interference from, for example, a previously undetected ham radio operator precludes its use. In another embodiment, and to avoid the noisy transmission path, the return data may be spread over a large portion of the spectrum and so travel secure and hidden in the noise.

A preferred alternative to spread spectrum, and one which alleviates its high cost, is to provide a plurality of data transmissions over a plurality of data channels spread over the entire return path spectrum. Thus, RF transmitter 730 may provide a number of separate data transmitters for transmitting a number of data transmissions over separate data channels. All such data transmitters of transmitter 730 are coupled in parallel and controlled by the microprocessor 700. Each data transmission is complete unto itself. Statistically, at least one such transmission on one channel is assured of reaching the headend 100 on any given day.

What is claimed is:

1. Reverse manifold apparatus for use in a cable television system at a location of off-premises subscriber service providing equipment adaptable for serving one or more subscribers, the reverse manifold apparatus comprising:
- a first diplexer;
- a second diplexer;
- said reverse manifold apparatus being coupled to a cable distribution plant side and to a subscriber premises side of the service providing equipment respectively by said first and second diplexers; and
- a signal link connected between said first and second diplexers for receiving at least one upstream data transmission from subscriber premises equipment for transmission to a headend.

2. Reverse manifold apparatus according to claim 1 further comprising:
- a filter coupled between the first diplexer and the signal link, the filter for passing an upstream data transmission of restricted bandwidth to the headend.

3. Reverse manifold apparatus according to claim 1 further comprising:
- a radio frequency switch coupled between the first diplexer and the signal link.

4. Reverse manifold apparatus according to claim 1 further comprising a filter and a radio frequency switch coupled between the first diplexer and the signal combiner.

5. Reverse manifold apparatus according to claim 1 connected on a subscriber premises side to a low pass filter, a radio frequency choke and the low pass filter being connected to the second diplexer, the radio frequency choke for receiving power for powering the off-premises service providing equipment supplied via a subscriber drop.

6. Reverse manifold apparatus according to claim 1 further comprising a data receiver for receiving data transmitted from a subscriber premises via the signal combiner and a controller for controlling communications with the service providing equipment.

7. Reverse manifold apparatus according to claim 6 further comprising a data transmitter coupled to the controller for transmitting confirmation and other data to the subscriber premises.

8. Reverse manifold apparatus according to claim 6 for use with subscriber service providing equipment including a radio frequency power amplifier, the controller responsive to the data receiver for setting the gain of the radio frequency power amplifier.

9. Reverse manifold apparatus according to claim 6 further comprising a data transmitter connected between the second diplexer and the controller, the controller further controlling upstream communications to the headend.

10. Reverse manifold apparatus according to claim 9 the data transmitter comprising a plurality of data transmitters operating simultaneously in parallel under control of the controller.

11. Reverse manifold apparatus for use in a cable television system at a location of off-premises subscriber service providing equipment adaptable for serving one or more subscribers, the reverse manifold apparatus comprising:
- a diplexer connected to the subscriber premises side of the service providing equipment;
- said reverse manifold apparatus being coupled between the service providing equipment and said diplexer;
- a signal combiner coupled to the diplexer for passing data transmitted from at least one subscriber served by the service providing equipment;
- a data receiver coupled to the signal combiner for receiving the data transmission; and
- a controller for controlling communication with the service providing equipment.

12. A method of controlling the gain of an off premises amplifier of cable television subscriber equipment comprising the steps of:
- receiving a subscriber initiated command to set a gain level of the amplifier,
- verifying that the subscriber has initiated the command, and
- establishing the gain level of the amplifier if the subscriber command is verified.

13. The subscriber amplifier gain control methods of claim 12 further comprising the step of:
- transmitting a confirmation to the subscriber that the gain level has been set.

14. A method of controlling parameters of off-premises cable television subscriber service providing equipment comprising the steps of:
- receiving a command transmitted over a secure transmission to set a parameter of the off-premises cable television subscriber service providing equipment,
- verifying the command,
- storing the parameter if the command is verified, and
- confirming the storing of the command.

* * * * *